(12) United States Patent
Karaoguz et al.

(10) Patent No.: US 9,250,971 B2
(45) Date of Patent: Feb. 2, 2016

(54) CENTRAL SYSTEM BASED USER INTERFACE RESOURCE MANAGEMENT

(75) Inventors: Jeyhan Karaoguz, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 365 days.

(21) Appl. No.: 13/589,914

(22) Filed: Aug. 20, 2012

(65) Prior Publication Data

US 2012/0317490 A1    Dec. 13, 2012

Related U.S. Application Data

(63) Continuation of application No. 10/874,430, filed on Jun. 23, 2004, now Pat. No. 8,271,880.

(60) Provisional application No. 60/504,889, filed on Sep. 22, 2003.

(51) Int. Cl.
| | | |
|---|---|---|
| *G06F 15/177* | (2006.01) | |
| *G06F 9/50* | (2006.01) | |
| *G06F 9/44* | (2006.01) | |
| *G06F 3/00* | (2006.01) | |

(52) U.S. Cl.
CPC ............ *G06F 9/5044* (2013.01); *G06F 9/4445* (2013.01); *G06F 2209/503* (2013.01)

(58) Field of Classification Search
CPC ...................... H04L 29/06027; H04L 65/4084; H04L 65/4076; H04N 21/4126; H04N 21/4143

USPC .................................................. 715/733–735
See application file for complete search history.

(56) References Cited

U.S. PATENT DOCUMENTS

| | | | | |
|---|---|---|---|---|
| 5,696,903 | A  * | 12/1997 | Mahany ........................ | 709/228 |
| 5,864,738 | A  * | 1/1999 | Kessler et al. ................ | 709/239 |
| 6,360,100 | B1 * | 3/2002 | Grob et al. .................... | 455/442 |
| 6,405,043 | B1 * | 6/2002 | Jensen et al. .................. | 455/446 |
| 6,628,965 | B1 | 9/2003 | LaRosa et al. | |
| 6,708,030 | B1 * | 3/2004 | Horikawa ...................... | 455/436 |
| 6,708,228 | B1 * | 3/2004 | Meyers et al. ..................... | 710/5 |
| 6,901,429 | B2 * | 5/2005 | Dowling ........................ | 709/203 |
| 7,103,359 | B1 * | 9/2006 | Heinonen et al. ............. | 455/436 |
| 7,149,511 | B1 * | 12/2006 | Bachner et al. ................ | 455/419 |
| 7,245,937 | B2 * | 7/2007 | Maari ........................... | 455/558 |
| 7,684,483 | B2 | 3/2010 | Coleman | |
| 2001/0048744 | A1 * | 12/2001 | Kimura ......................... | 380/247 |
| 2001/0054060 | A1 * | 12/2001 | Fillebrown et al. ........... | 709/201 |
| 2002/0035699 | A1 * | 3/2002 | Crosbie ......................... | 713/201 |

(Continued)

OTHER PUBLICATIONS

Definition of "Computer System". Google Search [online]. Google, 2009 [retrieved on Nov. 16, 2009]. Retrieved from the Internet: URL:http://www.googl.com/search?hl-en&rls=GGLD,GGLD:2... &sa-X&oi=glossary_definition&ct=title&ved-0CAkQkAE.

*Primary Examiner* — Nicholas Augustine
(74) *Attorney, Agent, or Firm* — Brinks Gilson & Lione

(57) ABSTRACT

A processing device includes a user interface module, the user interface module to connect the processing device with a user interface. A communication module connects the processing device with a mobile device. A communication link is established between the processing device and the mobile device. The communication module receives a request from the mobile device to display information. The user interface module sends the information for display on the user interface.

20 Claims, 5 Drawing Sheets

(56) References Cited

U.S. PATENT DOCUMENTS

| | | | |
|---|---|---|---|
| 2002/0052182 A1* | 5/2002 | Mayuzumi | 455/41 |
| 2002/0128041 A1* | 9/2002 | Parry | 455/560 |
| 2002/0132605 A1* | 9/2002 | Smeets et al. | 455/411 |
| 2003/0036386 A1* | 2/2003 | Harrison | 455/438 |
| 2003/0092437 A1* | 5/2003 | Nowlin et al. | 455/420 |
| 2003/0171147 A1* | 9/2003 | Sinclair et al. | 463/39 |
| 2003/0232593 A1* | 12/2003 | Wahlroos et al. | 455/3.05 |
| 2004/0142693 A1* | 7/2004 | Feder et al. | 455/443 |
| 2004/0171369 A1* | 9/2004 | Little et al. | 455/410 |
| 2004/0193675 A1* | 9/2004 | Fillebrown et al. | 709/203 |
| 2005/0027841 A1* | 2/2005 | Rolfe | 709/223 |
| 2005/0136958 A1* | 6/2005 | Seshadri et al. | 455/519 |
| 2006/0025135 A1* | 2/2006 | Karaoguz et al. | 455/436 |
| 2008/0016558 A1* | 1/2008 | Aull et al. | 726/9 |
| 2008/0158021 A1* | 7/2008 | Sheehan et al. | 341/22 |

* cited by examiner

CENTRAL SYSTEM BASED USER INTERFACE RESOURCE MANAGEMENT

CROSS-REFERENCE TO RELATED APPLICATIONS

This patent application is a continuation of U.S. patent application Ser. No. 10/874,430 filed Jun. 23, 2004, now U.S. Pat. No. 8,271,880 titled "CENTRAL SYSTEM BASED USER INTERFACE RESOURCE SHARING," which claims priority to U.S. provisional patent application Ser. No. 60/504,889 filed Sep. 22, 2003, the contents of which are hereby incorporated herein by reference in their entirety.

BACKGROUND

In a dynamic network environment, for example a wireless communication network, where devices may serve and be served by a changing list of other devices, the environment can include systems and methods for managing user interface resources. Present systems to not provide a user friendly and efficient mechanism for managing user interface resources in a dynamic network environment. Present systems may be deficient in a variety of ways. For example and without limitation, a present system may require a user to perform an inconvenient array of set-up procedures to utilize a particular user interface resource with a particular system. Such set-up procedures may include, for example, physically altering system connections and/or manually specifying communication link parameters. The user may, for example, have to perform such set-up procedures on numerous systems.

Also for example, a user may have to perform various inconvenient set-up procedures when the user desires to switch systems with which the user is utilizing a particular user interface resource. Such set-up procedures may include, for example, performing manual operations to tear down and establish communication links between the user interface resource and the old and new systems. The user may, for example, have to perform such set-up procedures on a multitude of systems, which may even comprise, for example, the system with which the user no longer desires to utilize the user interface resource.

DETAILED DESCRIPTION

Systems and methods are provided for managing the allocation and utilization of user interface (U/I) resources between communicatively coupled systems. Various aspects of the systems and methods comprise apparatus structure and method steps for establishing a wireless communication link between a first system and a second system. The second system may, for example, be communicatively coupled to one or more U/I resources. The first and second systems may have respective communication modules to assist in establishing and maintaining communication links between systems.

Figure 1:
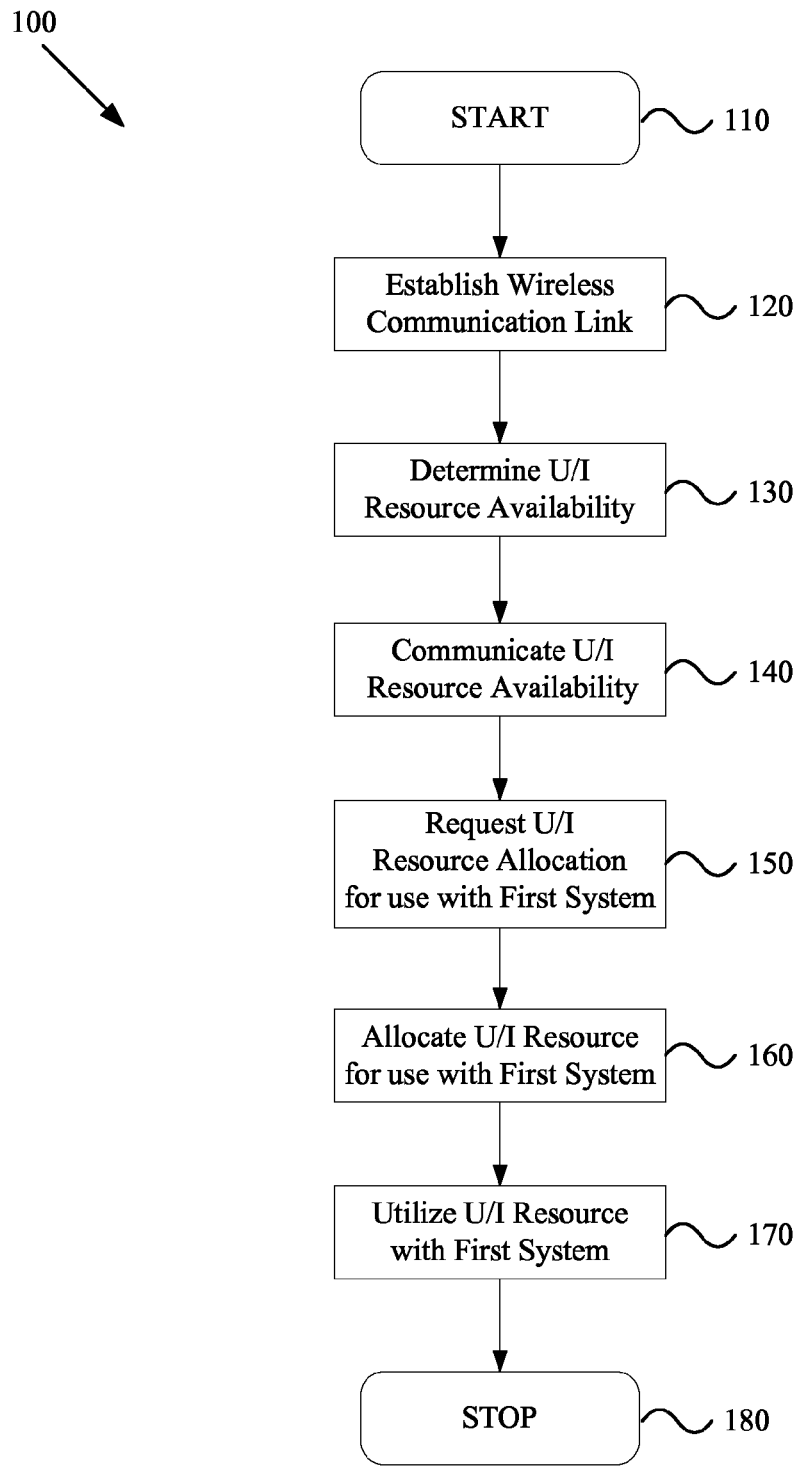
FIG. 1 is a flow diagram illustrating a method for managing a user interface resource, in accordance with various aspects of the systems and methods.

FIG. 1 is a flow diagram illustrating a method 100 for managing a user interface resource in accordance with various aspects of the systems and methods. The method 100 begins at step 110. Various events and conditions may cause the method 100 to begin. For example, a wireless resource may enter the boundaries of a wireless communication network. Such an event may occur, for example, when a user carries a portable wireless apparatus into the boundaries of a wireless communication network. Such boundaries may be defined according to wireless signal quality, noise conditions, precise physical boundaries, or any of a variety of conditions and characteristics that may define the boundaries of a wireless communication network. Alternatively, a user carrying a powered-down or sleeping mobile device within the boundaries of a wireless communication network may power-up or wake the device, and such act may trigger the method 100 to begin. Alternatively, for example, a user may explicitly force the method 100 to begin by entering a command on a device. Accordingly, the scope of various aspects of the systems and methods should not be limited to characteristics of particular events and conditions that cause the method 100 to begin.

The method 100, at step 120, comprises establishing a wireless communication link between a first system and a second system in the wireless communication network. The second system may, for example, comprise a networked station communicatively coupled to one or more user interface resources. Such user interface resources may, for example and without limitation, comprise any of a large number of devices, such as video input/output devices, audio input/output devices, keyboard input devices, mouse input devices, microphones, cameras, trackballs, thumbwheels, touch pads, voice recognition systems, laser scanning systems, printers, scanners, touch screens, CD players, DVD players, or any device that may provide for user interaction with a system. The user interface resources may be, for example, relatively sophisticated devices with their own advanced interfaces and processors, or the user interface resources may be relatively unsophisticated. The networked station may be communicatively coupled to the user interface resources over a variety of communication interfaces. Such interfaces may comprise, for example, wired, wireless RF, tethered optical and non-tethered optical interfaces. Accordingly, the scope of various aspects of the systems and methods should not be limited to characteristics of particular user interface resources or the nature of their respective communication interfaces.

Step 120 may, for example, comprise establishing a wireless communication link between the first and second systems using any of a variety of wireless communication protocols. Such protocol may be non-standard, such as a supplier's proprietary interface protocol, or standard, such as, for example, IEEE 802.11, IEEE 802.15, Bluetooth and ultra wideband (UWB) protocols. The communication link may, for example, be a contention-free communication channel, or the systems may utilize a contention-based communication protocol for their communications. Accordingly, the scope of various aspects of the systems and methods should not be limited in any way by characteristics of particular communication protocols, channels or links.

The method 100, at step 130, comprises determining the user interface (U/I) resources available for use with the first system. The second system may, for example, communicate with the first system over the communication link formed in step 120 to ascertain the capabilities of the first system. For example, in an exemplary scenario where the first system is a device with no audio information output capability, the second system may determine that the audio output user interface resource that is communicatively coupled to the second system is not available for use with the first system. In another example, the second system may determine that the first system is a personal email device that is capable of utilizing the keyboard user interface resource that is communicatively coupled to the second system. In a further example, the second system may determine that the first system has low-resolution video output capability and may be capable of utilizing at least a portion the video display user interface resource that is communicatively coupled to the second system.

Step 130 may comprise, for example, determining if the first system or second system have the communication capability to effectively utilize a user interface resource with the first system. Such communication capability may, for example, comprise data rate requirements, data translation capabilities, and encryption/decryption capabilities.

For example, particular user interface resources may require a minimum data rate to be effective. In such a scenario, the second system may determine if the first system and/or second system are capable of communicating at the appropriate data rate. Additionally, particular user interface resources may provide communication data in particular formats, so that translation between formats is necessary. For example, a personal email device may have a built-in mini-keyboard and may not have the capability to operate with an ASCII input, while a particular potentially available keyboard user interface resource may be limited to providing ASCII output. In such a scenario, the second device may determine if the second device or first device has the necessary information translation capabilities. In another exemplary scenario, the second system or first system may have a requirement that all communications with some or all U/I interface resources must be encrypted. In such a scenario, for example, the second system may determine that a U/I resource that does not have the required encryption capability is not available for use with the first system. In general, step 130 may determine if the first system is compatible with the user interface resource and capable of supporting the communication link(s) that are necessary to use the U/I resource with the first system.

Additionally, step 130 may determine if the U/I resource, or select portions thereof, is already being used with the second system or another system. For example, the second system may determine that a user of the second system is currently utilizing the mouse and keyboard U/I resources, and thus determine that the mouse and keyboard U/I resources are not available for use with the first system. Also for example, the second system may determine that the audio output resource coupled to the second system is already outputting music, and thus determine that the audio output resource is not available for use with the first system. Various U/I resources may also be capable of simultaneous use with multiple systems. For example, the second system may determine that a video display device may be used with the second system and the first system simultaneously.

The method, at step 140, comprises communicating the availability of various U/I resources. At this point, such communication may, for example, be in the form of human-perceivable signals or not. For example, the second system may communicate on a display coupled to the second system the availability of particular U/I resources for use with the first system. The user of the first system may then view information of the availability of various U/I resources on the video display of the second system.

Alternatively, for example, the second system may communicate information of the availability of particular U/I resources for use with the first system over the communication link to the first system. The first system may then provide such information to the user of the first system in user-perceivable form. The first system may communicate such information to the user in a variety of ways. For example, the first system may provide a textual or graphical indication on the first system's output display or an audible indication on the first system's audio output device. For example, the first system may highlight a keyboard icon to notify a user that a keyboard resource is available for use with the first system, or the first system may flash a speaker symbol to notify a user that an audio output resource is available for use with the first system. The first system may, for example, provide a user with a pull-down menu that lists available U/I resources. Accordingly, the scope of various aspects of the systems and methods should not be limited by the manner in which the availability of various U/I resources is communicated.

The method 100, at step 150, comprises requesting allocation of at least a portion of a user interface resource for use with the first system. Such requesting may comprise a wide variety of characteristics. For example and without limitation, such a U/I resource request may be performed by a user using the first system or the second system. A user of the first system may, for example, make such a request by selecting a graphical or textual indication on a display of the first system. Alternatively, for example, a user of the second system may make a request by selecting a graphical or textual indication on a display of the second system.

Such a request may be for allocation of a whole U/I resource or partial U/I resource. Various U/I resources may be properly allocated for use with only one system at a time, and other U/I resources may be properly allocated for use with multiple systems simultaneously. For example, the request may be for an entire keyboard U/I resource or an entire audio output U/I resource. Also, for example, the request may be for a single window or portion of a video output U/I resource or a portion of an audio or video input U/I resource.

A U/I resource request may, for example, comprise a signal communicated between systems. For example, the first system may automatically, or in response to a user input, request allocation of a U/I resource for use with the first system. For example, the first system may, in response to a user selection of an available resource indication, communicate a request to the second system for allocation of the selected U/I resource. Also, for example, the first system may be waiting for an indication of the availability of a particular U/I resource, and upon receipt of such indication, automatically request allocation of the U/I resource for use with the first system. Accordingly, the scope of various aspects of the systems and methods should not be limited to characteristics of a particular form or method of request for U/I resource allocation.

The method 100, at step 160, comprises allocating at least a portion of a U/I resource for use with the first system. The second system may, for example, after receiving a U/I resource request in step 150, allocate at least a portion of a U/I resource for use with the first system. For example, the second system may, after receiving a U/I resource request for allocation of a keyboard U/I resource, allocate the keyboard U/I resource for use with the first system. Also, for example, the second system may, after receiving a U/I resource request for allocation of a portion of a video display U/I resource, allocate a portion of the video display U/I resource for use with the first system.

Step 160 may comprise, for example, communicating the U/I resource allocation to a user in a human perceivable form, or communicating a signal indicating the allocation to the first system. In an exemplary scenario where step 160 comprises communicating a signal indicating the allocation to the first system, the first system may, for example, provide a human-perceivable indication that the U/I resource has been allocated for use with the first system. When presenting a user with an indication of the U/I resource allocation, the first or second systems may, for example, provide a graphical or textual indication on a video display device, or may provide an audible or physical indication. The first or second systems may provide the allocation indication in a large variety of manners, some of which may also comprise utilization of I/O capabilities of the allocated U/I resource. Accordingly, the scope of various aspects of the systems and methods should not be limited by characteristics of particular manners of providing human-perceivable information to a user.

Step 160 may also comprise maintaining a database of U/I resources and their respective allocations. For example, the second system may maintain a database that lists each U/I resource along with how each U/I resource is allocated. For example, the second system may maintain a database that lists a keyboard U/I resource as allocated for use with the first device, an audio output U/I resource as allocated for use with the second system, and a video output U/I resource as allocated for use with the first and second systems. The second system may, for example, refer to such a database when performing the determination of U/I resource availability in step 130.

The method 100, at step 170, comprises utilizing the allocated U/I resource with the first system. Such utilization may comprise, for example, performing various initialization operations. For example, step 170 may comprise establishing communication links between systems to provide for the desired data transfer rate between devices. For example, step 170 may comprise establishing any of a variety of communication links between the first and second systems. Such links may be nonstandard links or standard links. For example, such links may be governed by propriety communication protocols or standard communication protocols (e.g., IEEE 802.11, IEEE 802.15, Bluetooth and UWB). Such links may, for example, be contention-free or contention-based links. Step 170 may also comprise, for example, initializing the systems for encryption and decryption of information transferred between the systems. Such initialization may comprise, for example, encryption capability information and exchanging public keys. Accordingly, the scope of various aspects of the systems and methods should by no means be limited by characteristics of particular communication links or linking protocols.

Step 170 may comprise maintaining communication links between devices during use of the U/I resource(s). For example, step 170 may comprise maintaining an MPEG communication link between the first and second systems, through which the first system may provide MPEG video information to the second system for display on a video output U/I resource communicatively coupled to the second system. Also for example, step 170 may comprise maintaining an audio data streaming link between the first and second systems. Step 170 may generally comprise performing any necessary functions to maintain the communication links between systems. Accordingly, the scope of various aspects of the systems and methods should not be limited by characteristics of particular communication link maintenance activities.

Also, for example, step 170 may comprise performing encryption and decryption of information communicated between various devices. For example, step 170 may comprise the second system encrypting information typed at a keyboard U/I resource coupled to the second system prior to communicating such information to the first system over a wireless communication link. Step 170 may then also comprise decrypting the encrypted information after receipt of the encrypted information at the first system. Step 170 may also comprise, for example, translating information between formats that are compatible with respective systems involved with utilization of the user interface resource. Additionally, for example, information communicated from the first system to the second system may be similarly encrypted and decrypted. Step 170 may in general comprise performing any of a large variety of information transformation operations. Accordingly, various aspects of the systems and methods should by no means be limited by characteristics of particular information transformation procedures or techniques.

The method 100, at step 180, comprises ending execution of the method 100. Such ending may be initiated or triggered by a variety of events. For example and without limitation, a user may explicitly indicate to the first or second system that the user no longer desires to use the U/I resource with the first system. Also, for example, the first or second system may set a time limit for use of the U/I resource. Such time limit may comprise a time-of-use limit, or may alternatively, for example, comprise a time limit on inactivity. Additionally, a power-down event or a system exiting the communication network may trigger step 180. In general, any of a large number of events may trigger the end of the method 100. Accordingly, the scope of various aspects of the systems and methods should not be limited to characteristics of particular events that may cause the method 100 to end.

Step 180 may also comprise, for example, performing clean-up processing that is necessary upon ending use of the U/I resource. For example, step 180 may comprise performing processing and communication for de-allocating the U/I resource for use with the first system. For example, step 180 may comprise the second system maintaining a U/I resource database to indicate that the U/I resource is no longer allocated for use with the first system. Step 180 may, for example, comprise tearing down communication links that were established for communication between the first and second systems and de-allocating the associated communication bandwidth. Step 180 may, for example, comprise re-allocating the U/I resources for use with system A. Step 180 may in general comprise performing a large variety of clean-up functions. Accordingly, the scope of various aspects of the systems and methods should not be limited by characteristics of particular clean-up functions and procedures.

Figure 2:
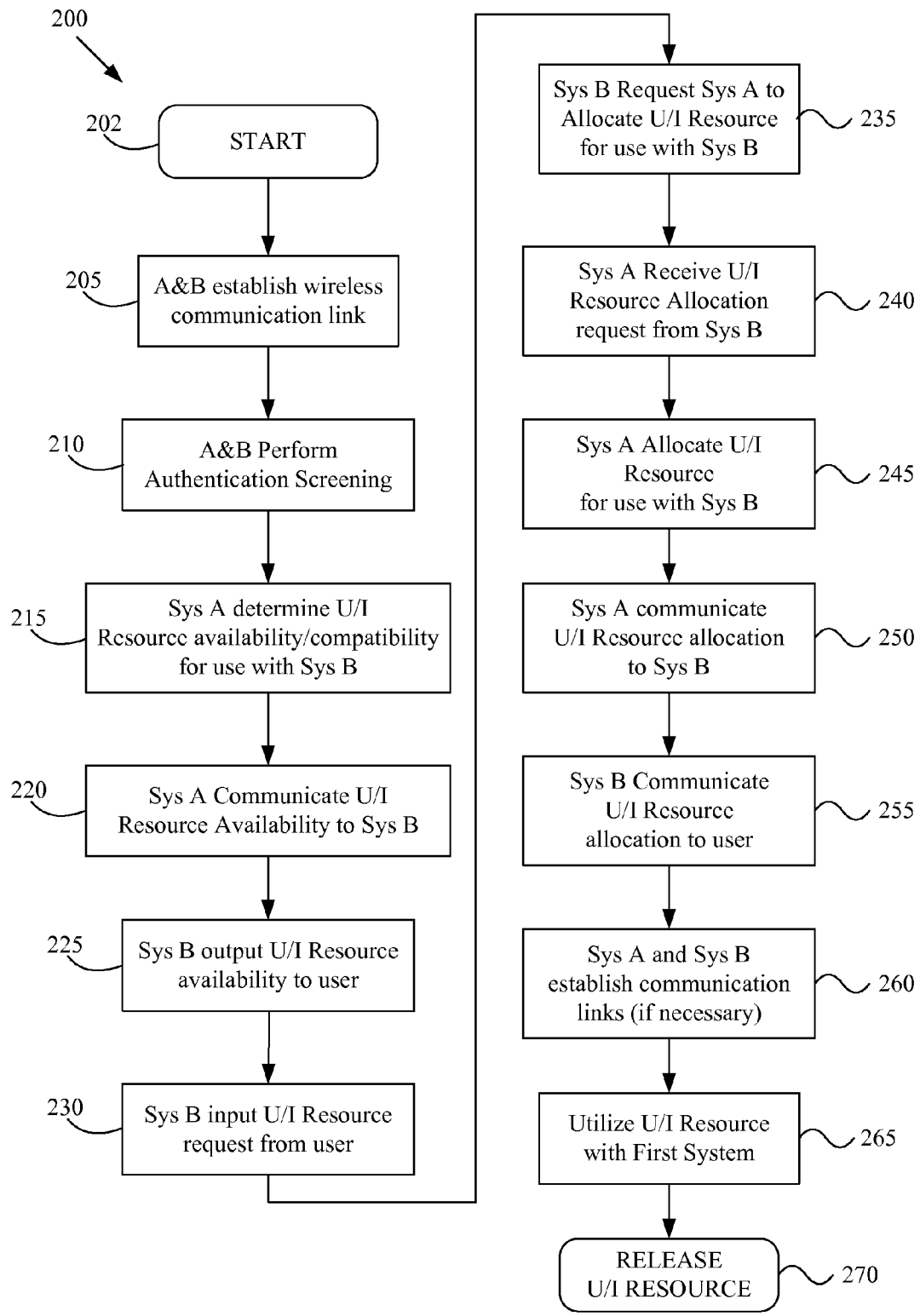
FIG. 2 is a flow diagram illustrating a method for managing a user interface resource, in accordance with various aspects of the systems and methods.

The exemplary method 100 illustrated in FIG. 1 illustrates a portion of various aspects of the systems and methods. FIG. 2 provides a second exemplary method 200 to illustrate further aspects of the systems and methods and to further illustrate at least a portion of the various aspects introduced by FIG. 1 and the previous discussion.

FIG. 2 is a flow diagram illustrating a method 200 for managing a user interface resource in accordance with various aspects of the systems and methods. FIG. 2 will be discussed in the context of an exemplary U/I resource management scenario. The details of the exemplary scenario are merely illustrative and should by no means limit the scope of various aspects of the systems and methods.

The method 200 begins at step 202. As discussed previously with regard to step 110 of the exemplary method 100 illustrated in FIG. 1, step 202 may be triggered or initiated by a wide array of events. For the present example, system B may be a personal digital assistant (PDA) device that a user carries into the user's office, the dimensions of which define the boundaries of a wireless communication network. Also, for the present example, system A may be a desktop computing system already operating in the wireless communication network and communicatively coupled to keyboard, mouse, video display and audio output U/I resources that system A has the capability to manage access to. System A and/or system B may, through the use of a wireless network communication protocol, detect the presence of the other system and initiate communication activity.

The method 200, at step 205, comprises the two exemplary systems, system A and system B establishing a wireless communication link. Various exemplary aspects of establishing such a wireless communication link were discussed previously with regard to step 120 of the method 100 illustrated in FIG. 1. In the exemplary scenario, system B may detect a beacon signal from system A and attempt to join the communication network. System A and system B may then establish a communication link over which the systems may communicate with each other. In the exemplary scenario, system A and B may communicate with each other using a contention-free timeslot allocated for such communication.

Figure 4:
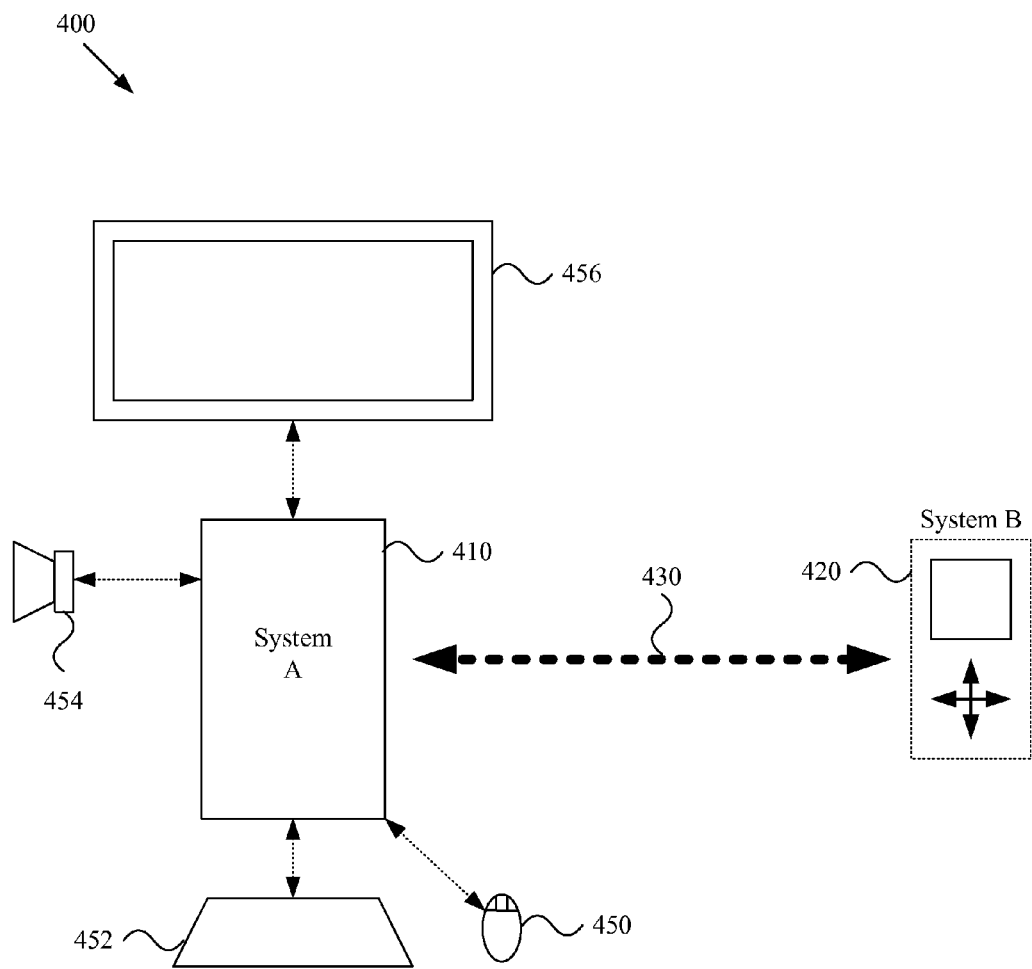
FIG. 4 is a diagram illustrating establishment of a dynamic user interface resource link, in accordance with various aspects of the systems and methods.

FIG. 4 is a diagram illustrating the exemplary communication environment 400. The environment 400 comprises exemplary system A 410 and exemplary system B 420. The environment also shows the communication link 430 established between system A 410 and system B 420. The communication link 430 may, for example, have been formed between system A 410 and system B 420 at method 200 step 205.

Referring back to FIG. 2, the method 200, at step 210, performs authentication screening. In the exemplary scenario, system A may communicate with system B to establish whether system B has access rights to the communication network. System A may determine whether system B is within the predefined geographical boundaries for the communication network (e.g., whether system B is in the same office as system A). The exemplary system A may also determine whether system B has rights to access particular resources (e.g., various U/I resources) communicatively coupled to the communication network or to devices therein.

The method 200, at step 215, comprises system A determining whether the various potentially available U/I resources are available for use with system B and compatible with system B. Various exemplary aspects of the availability and compatibility determination were discussed previously with regard to step 130 of the method 100 illustrated in FIG. 1. The availability determination may also comprise, for example, an authentication determination. For example, as previously discussed, the communication network and even particular resources in the communication network may have respective access rights.

In the exemplary scenario, system A may determine that system B is allowed access to all of the U/I resources managed by system A (i.e., the keyboard, mouse, video display and audio output U/I resources). The exemplary system A may perform this determination in part by checking an access list. The exemplary system A (or a user thereof) may be currently utilizing only a portion of the video display U/I resource, which may be designated in a U/I resource database as a device that multiple systems may utilize simultaneously. Thus, in the exemplary scenario, system A may determine that the keyboard U/I resource, mouse U/I resource, audio output U/I resource, and a portion of the video display U/I resource are available for use with system B.

FIG. 4 illustrates the various exemplary U/I resources in the exemplary environment 400. Exemplary system A is communicatively coupled to a mouse U/I resource 450, keyboard U/I resource 452, audio output U/I resource 454, and video display U/I resource 456. The environment 400 illustrated in FIG. 4 is merely exemplary. Accordingly, the scope of various aspects of the systems and methods should not be limited by characteristics of the exemplary environment 400.

Referring back to FIG. 2, the method 200, at step 220, may comprise the exemplary system A communicating the determined U/I resource availability to system B. Communicating the U/I resource availability was generally discussed previously with regard to step 140 of the method 100 illustrated in FIG. 1. In the current exemplary scenario, system A may communicate a wireless signal indicating U/I resource availability to system B. The method 200, at step 225, then may comprise the exemplary system B communicating the determined U/I resource availability to the user of system B. As mentioned previously with regard to step 140 of the method 100 illustrated in FIG. 1, such communication may occur in a variety of ways. For the exemplary scenario, system B may display a group of icons representing the available U/I resources to the user of system B.

The method, at step 230, comprises the exemplary system B receiving a request from the user of system B indicating which of the available U/I resources the user desires to utilize with system B. U/I resource requesting was generally discussed previously with regard to step 150 of the method 100 illustrated in FIG. 1. In the current exemplary scenario, the user of system B may desire to view and send email using one or more of the available U/I resources controlled by system A. The exemplary user may specify the desired U/I resources to system B by selecting icons associated with the U/I resources that the user desires to utilize. The exemplary user may select the keyboard U/I resource, the mouse U/I resource, and a portion of the video display U/I resource for use with system B.

The method, at step 235, comprises system B requesting system A to allocate one or more U/I resources for use with system B. Requesting U/I resource allocation was generally discussed previously with regard to step 150 of the method 100 illustrated in FIG. 1. In the exemplary scenario, as discussed above, the user may have indicated to system B that the user desires to use the keyboard U/I resource, mouse U/I resource, and a portion of the video display U/I resource with system B. System B may then, at step 235, communicate a signal to system A (e.g., over the wireless communication link established in step 205) requesting that system A allocate the desired U/I resources for use with system B.

The method 200, at step 240, comprises system A receiving a request for allocation of the desired U/I resources for use with system B. Requesting U/I resource allocation was generally discussed previously with regard to step 150 of the method 100 illustrated in FIG. 1. In the exemplary scenario, system A may receive the wireless signal sent from system B at step 235. That is, system A may receive a message from system B requesting the allocation of the keyboard U/I resource, mouse U/I resource, and a portion of the video display U/I resource for use with system B.

The method 200, at step 245, comprises system A allocating the requested U/I resources for use with system B. Allocating U/I resources was generally discussed previously with regard to step 160 of the method 100 illustrated in FIG. 1. In the exemplary scenario, system A may designate in a U/I resource database that the allocated U/I resources, or at least portions thereof, have been allocated for use with system B.

The method 200, at step 250, comprises system A communicating the U/I resource allocation to system B. Communication of the U/I resource allocation was generally discussed previously with regard to step 160 of the method 100 illustrated in FIG. 1. In the exemplary scenario, system A may communicate a message to system B that comprises an indication of the U/I resources that system A has allocated for use with system B.

The method 200, at step 255 comprises system B communicating the U/I resource allocation to the user. Communication of the U/I resource allocation was generally discussed previously with regard to step 160 of the method 100 illustrated in FIG. 1. In the exemplary scenario, system B may provide a human perceivable indication in the form of highlighted icons to the user of system B indicating that system A has allocated the requested U/I resources for use with system B. The exemplary user of system B may thereby have direct confirmation of the requested U/I resource allocation.

The method 200, at step 260, comprises system A and system B establishing communication links between the systems to provide for information flow during utilization of the allocated U/I resources with system B. Establishment of communication links for U/I resource utilization was generally discussed previously with regard to step 170 of the method 100 illustrated in FIG. 1. In the exemplary scenario, systems A and B may establish separate communication links for communicating information from the allocated mouse and keyboard U/I resources to system B. Exemplary systems A and B may also establish a communication link for communicating email information from system B to system A for display on the allocated video display U/I resource.

Figure 5:
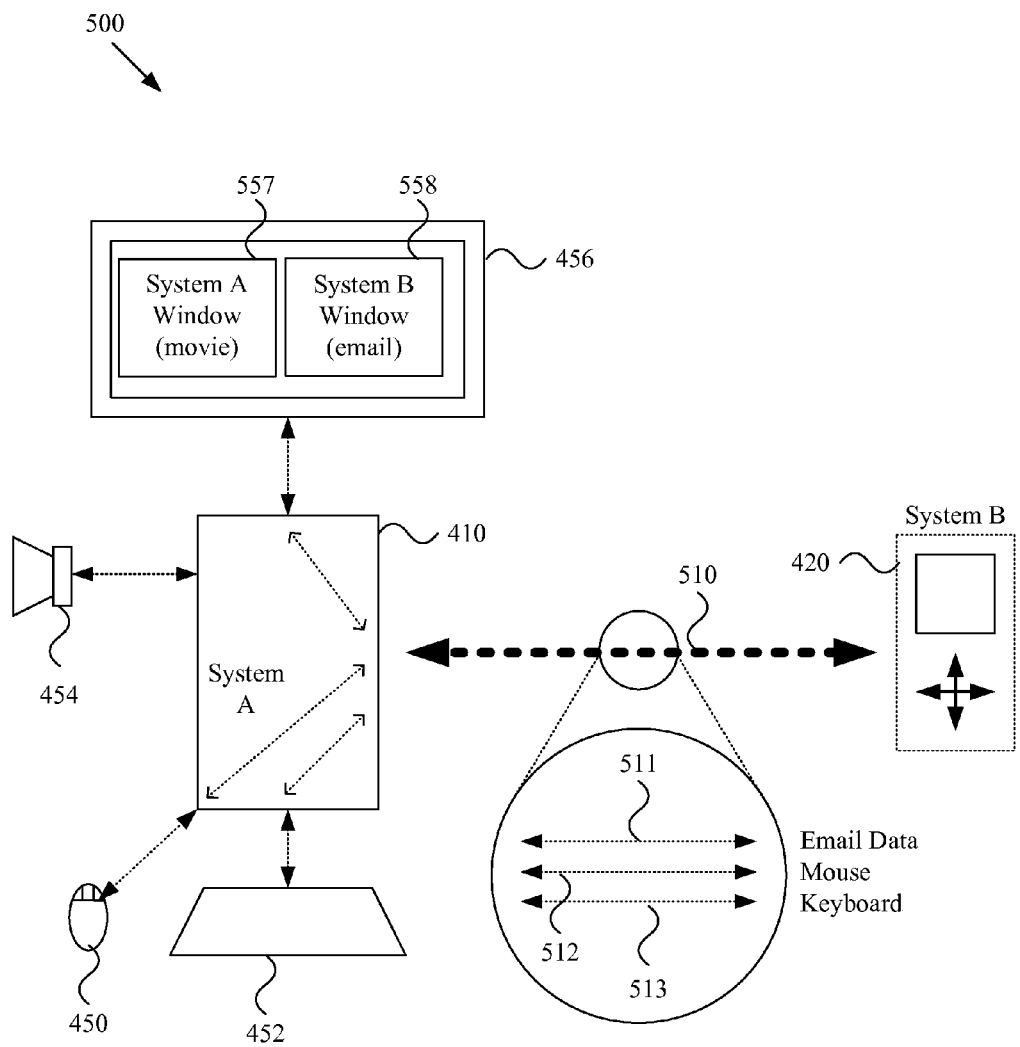
FIG. 5 is a diagram illustrating user interface resource sharing, in accordance with various aspects of the systems and methods.

FIG. 5 illustrates the exemplary allocated U/I resource environment 500. The environment 500 illustrates the exemplary communication links 510 discussed above. The exemplary communication links 510 comprise an email data communication link 511, mouse data communication link 512, and keyboard data communication link 513. The environment 500 illustrated in FIG. 5 is merely exemplary. Accordingly, the scope of various aspects of the systems and methods should not be limited by characteristics of the exemplary environment 500.

Referring back to FIG. 2, the characteristics of the communicated information may vary, for example, depending on the capabilities of the communicating systems. For example, if system A comprises an email application that is compatible with the email application of system B, system B may only need to communicate textual information to system A. Conversely, for example, if system A does not comprise an email application that is compatible with the email application of system B, system B may also communicate graphics information to system A. Additionally, as explained previously, systems A and B may cooperate to establish secure communication links and/or perform other data translation functions. Accordingly, the scope of various aspects of the systems and methods should not be limited by characteristics of the information communicated between the systems.

The method 200, at step 265, comprises utilizing the allocated U/I resources. U/I resource utilization was discussed generally with regard to step 170 of the method 100 illustrated in FIG. 1. In the exemplary scenario, the user utilizes the keyboard and mouse U/I resources to input information and commands to system B. For example, information of user interaction with the keyboard and mouse U/I resources may travel between the respective U/I resources and system A, and also travel through system A and between system A and system B. In various alternative scenarios, information may also travel between the U/I resources and system B directly. In the exemplary scenario, system A may encrypt the information from the keyboard U/I resource prior to communicating such information to system B. System B may then decrypt such information after receiving the information.

The exemplary environment 500 of FIG. 5 illustrates exemplary information flows between various U/I resources and system A 410 and through system A 410 as discussed above.

Referring back to FIG. 2, step 265, in the exemplary scenario, comprises system B communicating information with system A to display on the portion of the video display U/I resource allocated for use with system B. The exemplary system B provides encrypted textual and graphical email information to system A. Exemplary system A then decrypts the email information received from system B and drives a window in the video display U/I resource to present the information to the user in human-perceivable form.

The exemplary environment 500 of FIG. 5 illustrates the exemplary video display U/I resource 456, which is shown as being shared between system A 410 and system B 420. For example, a first portion 557 of the video display U/I resource 456 is being used with system A 410 to output a movie to a user in human-perceivable form. Additionally, for example a second portion 558 of the video display U/I resource 456 is being used with system B 420 to output email information to a user in human-perceivable form.

Referring back to FIG. 2, the method 200, at step 270, comprises releasing, or de-allocating, the U/I resources that were allocated for use with system B. Resource releasing, or de-allocating, was discussed generally with regard to step 180 of the method 100 illustrated in FIG. 1. In the exemplary scenario, the user may leave the office with the PDA (system B). That is, the user may remove system B from the geographical boundaries of the communication network. The exemplary system A may respond by removing the system B window from the video display U/I resource. The exemplary system A may break down the communication links established for the utilization of the allocated U/I resources with system B. The exemplary system A may also maintain the U/I resource database to indicate that the allocated U/I resources are no longer allocated for use with system B. System A may then re-allocate the keyboard U/I resource, mouse U/I resource and portion of the video display U/I resource for use with system A and may establish communication links necessary for such use. The exemplary method 200 may, for example, complete with the exemplary system A and U/I resources in the respective states that they were in prior to the entrance of exemplary system B into the communication network.

As mentioned previously, FIG. 2 illustrates an exemplary method 200 to illustrate a subset of various aspects of the systems and methods. The exemplary method 200 was shown and discussed for illustrative purposes, and accordingly, the details of the exemplary illustration should by no means limit the scope of various aspects of the systems and methods.

Figure 3:
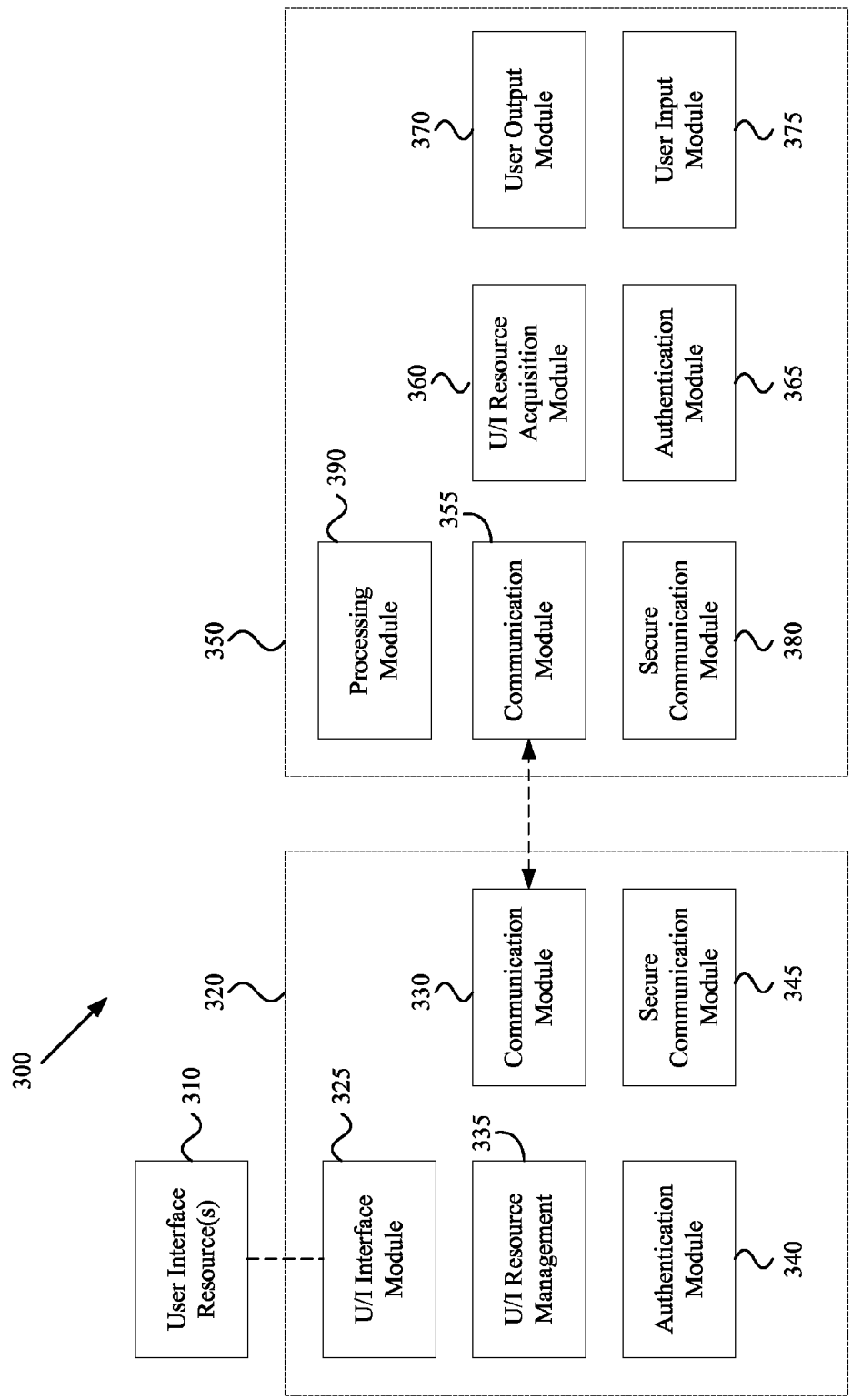
FIG. 3 is a diagram illustrating a system for managing a user interface resource, in accordance with various aspects of the systems and methods.

FIG. 3 is a diagram illustrating a system 300 for managing a user interface resource in accordance with various aspects of the systems and methods. The system 300 and various components of the system 300 may, for example, implement various aspects of the systems and methods as discussed previously with regard to the methods 100, 200 illustrated in FIGS. 1 and 2. Note, however, that the structure and operation of the various components of the system 300 should not be limited to structure performing the various aspects of the systems and methods as discussed previously with regard to the methods 100, 200 illustrated in FIGS. 1 and 2.

The exemplary system 300 comprises a first system 320 and a second system 350. The first system 320 may comprise, for example, a U/I interface module 325, a communication module 330, a U/I resource management module 335, an authentication module 340, and a secure communications module 345. The second system 330 may comprise, for example, a communication module 355, a U/I resource acquisition module 360, an authentication module 365, a user output module 370, a user input module 375, a secure communications module 380 and a general processing module 390.

The first system 320 may comprise, for example, a U/I interface module 325. The U/I interface module 325 may communicatively couple the first system 320 to one or more U/I resources 310. Such user interface resources may, for example and without limitation, comprise any of a large number of devices, such as video input/output devices, audio input/output devices, keyboard input devices, mouse input devices, microphones, cameras, trackballs, thumbwheels, touch pads, voice recognition systems, laser scanning systems, printers, scanners, touch screens, CD players, DVD players, or any device that may provide for user interaction with a system. The user interface resources may be, for example, relatively sophisticated devices with their own advanced interfaces and processors, or the user interface resources may be relatively unsophisticated.

The U/I interface module 325 may, for example, comprise various interface logic circuitry necessary for communicating effectively with various U/I resources. The U/I interface module 325 may communicatively couple the first system 320 to the user interface resources over a variety of communication interfaces. Such interfaces may comprise, for example, wired, wireless RF, tethered optical and non-tethered optical interfaces. Accordingly, the scope of various aspects of the systems and methods should not be limited to characteristics of particular user interface resources or the characteristics of particular communication interface hardware.

The first system 320 may comprise, for example, a communication module 330 that, for example, establishes wireless communication links with other devices. For example, the communication module 330 may establish a wireless communication link with the second system 350. The communication module 330 may establish wireless communication links with devices using any of a variety of wireless communication protocols. Such a protocol may be, for example, a non-standard protocol, such as, for example, a supplier's proprietary protocol. Such a protocol may be, for example, a standard protocol, such as, for example, IEEE 802.11, IEEE 802.15, Bluetooth and ultra wideband (UWB) protocols. The communication module 330 may, for example, establish communication links that are contention-free or contention-based. Accordingly, the scope of various aspects of the communication module 330 or other aspects of the systems and methods should not be limited by characteristics of particular communication protocols or communication channel or link types.

The first system 320 may, for example, comprise an authentication module 340, which determines if the second system 350 is authorized to communicate with the first system 320 or authorized to utilize resources controlled by the first system 320. For example, the communication module 330 may utilize the authentication module 340 to determine if the second system 350 is within a set of geographical boundaries that determine the scope of a communication network. The authentication module 340 may also, for example, determine if the second system 350 is on a list of systems authorized to communicate with the first system 320. The authentication module 340 may also, for example, determine if the user of the second system 350 is authorized to use the first system 320 or user interface resources communicatively coupled thereto. The authentication module 340 may generally perform authentication operations. Accordingly, the scope of various aspects of the authentication module 340 and other aspects of the systems and methods should not be limited by the aforementioned examples.

The first system 320 may comprise, for example, a U/I resource management module 335. The U/I resource management module 335 may generally manage utilization of U/I resources, such as, for example, U/I resources that are communicatively coupled to the first system 320.

The U/I resource management module 335 may, for example, determine if U/I resources are available for use with another system (e.g., the second system 350). The U/I resource management module 335 may, for example, utilize the communication module 330 to communicate with the second system 350 to determine various capabilities of the second system 350. For example, in an exemplary scenario where the second system 350 is a system with no audio output capability, the U/I resource management module 335 may determine that an audio output U/I resource that is communicatively coupled to the first system 320 is not available for use with the second system 350. In another example, the U/I resource management module 335 may determine that the second system 350 is a personal email device that is capable of utilizing the keyboard U/I resource that is communicatively coupled to the first system 320. In a further example, the U/I resource management module 335 may determine that the second system 350 has a low-resolution video output capability and may be capable of utilizing at least a portion of a video display U/I resource that is communicatively coupled to the first system 320.

The U/I resource management module 335 may, for example, determine if the first system 320 and second system 350 have the communication capability to effectively utilize a particular U/I resource with the second system 350. Such a determination may comprise, for example, determining necessary data rate capabilities, data translation capabilities, and secure communication capabilities.

For example, particular U/I resources (e.g., those utilizing audio and video data streaming) may require a minimum data rate to be effective. In such a scenario, the U/I resource management module 335 may determine if the first system 320 and second system 350 are capable of communicating information at the appropriate data rate. Additionally, particular U/I resources may provide and accept communication data in particular formats, so translation between formats may be necessary. In such a scenario, the U/I resource management module 335 may determine if the first device 320 and second device 350 have the necessary data translation capabilities.

In another example, a particular U/I resource, or at least one of the first system 320 and second system 350, may require that communications between various devices and systems be secure. In such a scenario, the U/I resource management module 335 may determine if the various systems and resources have the necessary secure communications capability (e.g., encryption and decryption capability). Additionally, the U/I resource management module 335 may utilize the authentication module 340 to perform authentication related to particular U/I resources. For example, the U/I resource management module 335 may determine that a user of the second system 350 may use some U/I resources with the second system 350, but not others. In an exemplary scenario, the U/I resource management module 335 may allow utilization of keyboard and mouse U/I resources with the second system 350, but not allow utilization of an audio output system with the second system 350.

The U/I resource management module 335 may, for example, also determine if U/I resources, or portions thereof, are already allocated for use with various systems. For example, the U/I resource management module 335 may comprise a database of information about U/I resource allocation. The U/I resource management module 335 may, in an exemplary scenario, determine that a user of the first system 320 is currently utilizing mouse and keyboard U/I resources, so such resources are not available for use with the second system 350. In another exemplary scenario, the U/I resource management module 335 may determine that an audio output U/I resource communicatively coupled to the first system 320 is not currently being utilized and is available for use with the second system 350. Various U/I resources may be capable of simultaneous use with multiple systems. For example, the U/I resource management module 335 may determine that a video display U/I resource is capable of being used with the first system 320 and the second system 350 simultaneously (e.g., outputting information in different windows).

The U/I resource management module 335 may communicate the availability of various U/I resources. The U/I resource management module 335 may, for example, communicate such U/I resource availability to a user in human-perceivable form using the U/I interface module 325 to drive a video display U/I resource. The U/I resource management module 335 may utilize the U/I interface module 325 to communicate U/I resource availability to a user in a variety of ways. For example, the U/I interface module 325 may utilize the U/I interface module 325 to drive a video display U/I resource to present textual or graphical information to a user. Also, for example, the U/I interface module 325 may utilize the U/I interface module 325 to drive an audio output U/I resource to provide information to a user.

Alternatively, for example, the U/I resource management module 335 may utilize the communication module 330 to communicate information of the availability of various U/I resources to the second system 350. The communication module 330 may, for example, communicate such information to the communication module 355 of the second system 350 over a wireless communication link. The second system 350 may then, for example, present the exemplary U/I resource availability to a user in human-perceivable form.

The second system 350 may receive U/I resource availability information from the first system 320 at the communication module 355 of the second system 350. The second system 350 may comprise a U/I resource acquisition module 360 communicatively coupled to the communication module 355. The U/I resource acquisition module 360 may utilize the user output module 370 to provide human-perceivable information of the U/I resources available for use with the second system 350 to a user. The U/I resource acquisition module 360 may, for example, utilize the user output module 370 to output information on a video display device. Such information may, for example, take the form of textual or graphical indications. The U/I resource acquisition module 360 may also, for example, utilize the user output module 370 to provide audible information of the available U/I resources to a user. The U/I resource acquisition module 360 may generally utilize the user output module 370 to communicate information of the available U/I resources for use with the second system 350. Accordingly, the scope of various aspects of the U/I resource acquisition module 360 or other aspects of the systems and methods should no be limited by characteristics of particular methods or apparatus that may communicate such information.

Allocation of one or more available U/I resources for use with the second system 350 may be requested in a variety of ways. For example, in a scenario where the first system 320 communicates information of available U/I resources in human-perceivable form, an exemplary user may request allocation of at least a portion of one or more U/I resources for use with the second system 350 using the I/O capabilities of the first system 320. For example, a user may utilize a mouse and video display coupled to the U/I interface module 325 of the first system 320 to indicate the desired U/I resource(s) by selecting graphical or textual indicia provided to the user on the video display.

In an exemplary scenario where the first system 320 communicates information of available U/I resources to the second system 350 and the second system 350 (e.g. using the user output module 370) provides information of the available U/I resources to the user, the user may, for example, utilize I/O features of the second system 350 to indicate the U/I resources that the user desires to use with the second system 350. The user may, for example, indicate a U/I resource by, for example, selecting an icon associated with the desired U/I resource on an output display of the second system 350. The second system 350 may receive the user's selection of U/I resources through the user input module 375. The U/I resource acquisition module 360 of the second system 350 may then, for example, utilize the communication module 355 to communicate information of the U/I resource selection to the first system 320.

In another exemplary scenario, the U/I resource acquisition module 360 may have been previously instructed to search for and acquire access to one or more U/I resources. For example, a user of the second system 350 may have instructed the U/I resource acquisition module 360 to continually search for keyboard and monitor U/I resources that are available for use with the second system 350. The U/I resource acquisition module 360 may then, for example, automatically process a signal from the first system 320 that keyboard and monitor U/I resources are available for use with the second system 350 by automatically formatting and communicating a request to the first system 320 for allocation of the desired U/I resources for use with the second system 350.

In general, there are a large variety of manners in which a request for allocation of U/I resources for use with the second system 350 may be made. Accordingly, the scope of the U/I resource acquisition module 360 and various other aspects of the systems and methods should not be limited by characteristics of any particular method or apparatus for requesting allocation of U/I resources.

The U/I resource management module 335 of the first system 320 may receive a request for allocation of U/I resources. For example, in a scenario where a user has requested a U/I resource allocation using an input device coupled to the first system 320, the U/I resource management module 335 may receive such a request from the U/I interface module 325. Also for example, in a scenario where information of a U/I resource allocation request arrives in a signal communicated from the second system 350, the U/I resource management module 335 may receive such a request from the communication module 330 of the first system 320. The U/I resource management module 335 may generally receive a request for allocation of one or more U/I resources in a large variety of ways. Accordingly, the scope of various aspects of the U/I resource management module 335 or other aspects of the systems and methods should not be limited by characteristics of any specific method or apparatus associated with the receipt of such a request.

After receiving a request for allocation of at least a portion of a U/I resource for use with the second system 350, the U/I resource management module 335 may, for example, allocate the requested U/I resource(s) for use with the second system 350. For example, the U/I resource management module 335 may maintain a database of U/I resources to track U/I resource allocations.

The U/I resource management module 335 may then, for example, communicate a U/I resource allocation. Such communication may take a variety of forms. For example, the U/I resource management module 335 may utilize the U/I interface module 325 to communicate information of the U/I resource allocation to a U/I resource 310 communicatively coupled to the first system 320. Such a U/I resource 310 may comprise, for example, a requested U/I resource or another U/I resource. Alternatively, for example, the U/I resource management module 335 may utilize the communication module 330 to communicate a wireless signal to the second system 350 indicative of the U/I resource allocation. The U/I resource acquisition module 360 of the second system 350 may receive such a signal through the communication module 355 and utilize the user output module 370 to drive an output device that presents information of the U/I resource allocation to a user in human-perceivable form. Such an exemplary indication may, for example, comprise a textual, graphical, audible or physical indication. The first system 320 and second system 350 may generally communicate information of the U/I resource allocation using a variety of methods and mechanisms. Accordingly, the scope of various aspects of the systems and methods should not be limited by characteristics of particular information communication methods and mechanisms.

After allocation of at least a portion of one or more U/I resources for use with the second system 350, the first system 320 and second system 350 may establish one or more communication links necessary for the effective utilization of the allocated U/I resource(s). For example, the U/I resource management module 335 of the first system 320 may interface with the U/I resource acquisition module 360 of the second system 350, through their respective communication modules 330, 355 to establish the communication links. The communication links may be standard or non-standard links. For example, such links may be based on proprietary communication protocols or standard communication protocols (e.g., IEEE 802.11, IEEE 802.15, Bluetooth and UWB). Such links may, for example, be contention-free or contention-based links. Such link establishment may also comprise initializing and utilizing respective secure communication modules 345, 380 of the first system 320 and the second system 350. The communication links may generally exhibit a large variety of communication link characteristics. Accordingly, the scope of various aspects of the systems and methods should not be limited by characteristics of particular communication linking methods and apparatus.

The first system 320 and second system 350 may maintain the communication links during use of the allocated U/I resources with the second system 350. Such communication links may comprise, for example, communication links for streaming video and audio information between the systems. Such communication links may also comprise, for example, keystroke or mouse movement information.

For example and without limitation, the user may utilize the allocated U/I resources communicatively coupled to the U/I interface module 325 of the first system 320, which in turn, is communicatively coupled to the second system 350. In such an exemplary scenario, various components of the first system 320 (e.g., the U/I interface module 325, U/I resource management module 335, secure communication module 345 and communication module 330) may participate in communicating U/I resource information between the allocated U/I resource(s) and the second system 350. Such information communication may, for example, comprise various forms of information translation and communication. Alternatively, at least a portion of U/I resource information may flow directly between the respective allocated U/I resources and the second system 350. Accordingly, the scope of various aspects of the systems and methods should not be limited by characteristics of particular communication flow paths and related devices. Neither should the scope of various aspects of the systems and methods be limited by characteristics of particular uses of allocated U/I resources.

The processing module 390 of the second system 350 may, for example, communicate U/I resource information with the various components of the second system 350. For example, the processing module 390 may utilize the secure communication module 380 to encrypt and decrypt U/I resource information. The processing module 390 may, for example, interact with the output module 370 to provide information to a user in human-perceivable form. The processing module 390 may, for example, interact with the user input module 375 to receive information from a user utilizing an input device of the second system 350.

Following use of a U/I resource allocated for use with the second system 350, the first system 320 and second system 350 may act to release (or de-allocate) the U/I resource. For example, a user may indicate to the first system 320 or second system 350 that the user is done utilizing the U/I resource. Alternatively, for example, an inactivity timer may expire to trigger the U/I resource management module 335 to release a U/I resource from use with the second system 350. Also, for example, the communication module 330 of the first system 320 may detect that the second system 350 is no longer within communication range of the first system 320 or no longer within the geographical confines of a communication network. In another example, a user of another system may take priority over a user of the second system 350 and initiate a re-allocation of the U/I resource from use with the second system 350 to use with the other system. The end of use of a U/I resource may be indicated or determined in a variety of ways and with a variety of devices. Accordingly, the scope of various aspects of the systems and methods should by no means be limited to characteristics of particular end-of-use scenarios or associated methods and devices.

After and end of use is determined, the U/I resource management module 335 may, for example, interface with the communication module 330 to tear down communication links established to support utilization of an allocated U/I resource with the second system 350. The U/I resource management module 335 may also, for example, maintain a U/I resource database to indicate that a U/I resource previously allocated for use with the second system 350 is no longer so allocated. Various components of the second system 350 may also act to release an allocated U/I resource. For example, the processing module 390, U/I resource Acquisition module 360, and communication module 355 may act to tear down communication links between the first system 320 and second system 350 and to clean up communication paths between modules within the second system 350.

In summary, aspects of the systems and methods provide systems and methods for managing the allocation and utilization of user interface resources between communicatively coupled systems. While the systems and methods have been described with reference to certain aspects and embodiments, it will be understood by those skilled in the art that various changes may be made and equivalents may be substituted without departing from the scope of the systems and methods. In addition, many modifications may be made to adapt a particular situation or material to the teachings of the systems and methods without departing from its scope. Therefore, it is intended that the systems and methods not be limited to the particular embodiment disclosed, but that the systems and methods will include all embodiments falling within the scope of the appended claims.

What is claimed is:

1. A second system comprising:
   user interface circuitry, the user interface circuitry to connect the second system with at least one of a plurality of user interface devices;
   communication circuitry, the communication circuitry to connect the second system with a first system, where a wireless communication link is established between the second system and the first system using the communication circuitry automatically based upon the first system coming within boundaries of a wireless communication network that the second system resides in;
   the communication circuitry to automatically communicate availability of each of the plurality of connected user interface devices over the communication link to the first system based upon availability and compatibility with the first system, and the communication circuitry to receive a request from the first system over the communication link to display information;
   and
   the user interface circuitry to send the information from the second system for display on a user selected one or more of the user interface devices.

2. The processing device of claim 1 where the communication link includes a link for streaming information from the mobile device.

3. The processing device of claim 2 where the streaming information includes video and audio information.

4. The processing device of claim 2 where the streaming information includes music.

5. The processing device of claim 2 where the streaming information comprises keystroke or mouse movement information.

6. The processing device of claim 1 where the user interface comprises a video display.

7. The processing device of claim 1 where the communication link comprises a wireless link.

8. The processing device of claim 1 where the mobile device includes a display to show an icon.

9. The processing device of claim 1 where an icon for display at the mobile device represents a link to the user selected one of the at least one user interface device.

10. The processing device of claim 9 where selection of the user selected one of the at least one user interface device is in response to receipt by the communication circuitry of a signal indicative of selection of the icon by a user of the mobile device.

11. The processing device of claim 1 where the communication module encrypts or decrypts information communicated between the mobile device and the user interface device.

12. A method for displaying video, comprising:
    establishing a wireless communication link between a second system as a network device and a first system as a mobile device;
    automatically identifying with the network device one or more user interface resources that are compatible with the mobile device based on capabilities of the mobile device that are determined by the network device, the user interface resource being a user interface device that is communicatively coupled with the network device via interface circuitry included in the network device;
    communicating automatically based upon the mobile device coming within boundaries of a wireless communication network that the network device resides in, an availability of the compatible one or more user interface resources;
    transmitting for display on the mobile device the availability of the compatible one or more user interface resources for user selection;
    and
    utilizing by the mobile device the one or more compatible user interface resources through the network device.

13. The method of claim 12 further comprising authenticating the communication link.

14. The method of claim 12 further comprising displaying an indication of the user interface resource being available to the mobile device.

15. The method of claim 14 where the display indication includes an icon.

16. The method of claim 12 where the available user interface resource comprises a video display.

17. The method of claim 12 further comprising streaming video from the mobile device through the network device to the available user interface resource.

18. A second system comprising: a network station;
    a user interface circuitry connected with a video display via a communication interface;
    communication circuitry, the communication circuitry to connect the network station with a first system which is a mobile device, wherein a wireless communication link is established between the network station and the mobile device using the communication circuitry automatically based upon the mobile device coming within boundaries of a wireless communication network that the network station resides in;
    and resource management circuitry to automatically manage allocation of at least part of the video display for use by the mobile device based on determination of:
    capabilities of the mobile device, availability of the video display, and compatibility of the mobile device and the video display so that the information from the mobile device is communicated to the video display.

19. The network station of claim 18 where the information is streamed from the mobile device through the network station to the video display.

20. The processing device of claim 1, wherein the information sent by the mobile device is communicated through the processing device to the user interface circuitry.

* * * * *